Patented Feb. 20, 1951

2,542,322

UNITED STATES PATENT OFFICE 2,542,322

METHOD OF PREPARING CALCIUM SILICATE PHOSPHOR

Herman C. Froelich, Cleveland Heights, Ohio, assignor to General Electric Company, a corporation of New York No Drawing. Application August 15, 1949, Serial No. 110,476

4 Claims. (Cl. 252—301.4)

My invention relates generally to fluorescent materials or phosphors and more particularly to calcium silicate phosphors. Still more particularly, my invention relates to a method of preparing phosphor of calcium silicate activated with lead and manganese.

Such phosphor has given good results when employed in fluorescent lamps of the low pressure mercury vapor type. However, it is very difficult to produce, particularly on a large scale. Several methods have heretofore been employed to prepare this phosphor. One of these comprises firing the phosphor ingredients in an atmosphere of steam, as disclosed and claimed in my application Serial No. 714,672, filed December 6, 1946, and now Patent No. 2,525,028, issued October 10, 1950, and in British patent 577,694. With this method bright phosphors can be obtained with a firing time of about 2 hours. However, this method does not lend itself to inexpensive large-scale production in stationary furnaces.

According to another method employed heretofore, use is made of the catalytic action of fluoride in preparing the phosphor in air. Presumably, an atmosphere of $SiF_4$ is formed within the powder while it is being fired in air and this fluoride atmosphere promotes phosphor formation in a manner similar to steam. The fluoride may be introduced as $PbF_2$. However, the total firing time is much longer and may consist of two periods of 6 hours each, or a total of 12 hours. In larger scale production and with a large furnace it has been found necessary to fire for as long as 24 hours in order to produce powders as bright as those fired for 2 hours in steam. This is obviously a serious drawback for large-scale production.

An object of my invention is to provide a method of preparing this calcium silicate phosphor whereby the phosphor may be prepared on a large scale with a relatively short firing period, and which will produce phosphors having a high efficiency.

According to the present invention, I have discovered that when the phosphor ingredients are fired with a catalyst consisting of a combination of fluoride and chloride, the combination is much more potent and behaves differently than either one of these halides alone. Phosphors have been thus prepared in about three hours total firing time and they have a brightness as good as or better than phosphors prepared by firing in steam. Particularly good results have been obtained with fluorides and chlorides of calcium or ammonium.

In preparing a phosphor, a base mixture may be prepared containing compounds of calcium and silicon which will react to form calcium silicate together with activating proportions of manganese and lead compounds. While the mol ratio between calcium oxide and silica is not very critical, I prefer to employ an excess of silica over the stoichiometric ratio for $CaSiO_3$. Mol ratios of 1:1.1 to 1:1.2 have given very good results and even 1:1.5 may be used satisfactorily. In accordance with previous practice, I may employ oxides of calcium and silicon or materials which, upon heating, break down to yield the oxides. Similarly, various compounds may be employed as the source of the manganese and lead activators. Good results have been obtained by mixing some $CaF_2$ with the base mixture, firing it in a lead-conditioned furnace for about 1 to 3 hours in air (depending upon batch size), remixing it with some $CaCl_2$ (either wet or dry) and refiring it for 1 to 2 hours (again depending upon batch size). Good results have also been obtained by ball-milling dry the base ingredients with fluoride, wetting the powder down with a solution of chloride, drying it, screening it and giving it a single fire in air for 3 to 4 hours. The firing temperature may be in the range of about 1000–1200° C., whether the firing be in a single step or in two steps.

By way of example, the phosphor may be prepared by the following methods:

*Example I.*—This involves a double firing. A batch is made up consisting of 300 grams $CaCO_3$, 240 grams silicic acid (91 per cent $SiO_2$), 20 grams $MnCO_3$, 11 grams PbO and 5 grams $CaF_2$. The batch is ball-milled dry for 2 hours, loaded onto open silica trays, and fired at a temperature of 1160° C. for 2 hours. When cold, the mass is again ball-milled dry for about a half hour with 2–5 per cent of its weight added $CaCl_2 \cdot 2H_2O$. It is then refired on open trays at 1160° C. for 2 hours.

*Example II.*—This is a single firing method. A batch is made up in accordance with Example I given above but employing 5–10 grams $CaF_2$ and 6–12 grams $CaCl_2 \cdot 2H_2O$ in the original compounding of the material. The batch is fired in open silica trays for 3 to 4 hours at 1160° C. In a slight variation of this method, the ingredients, exclusive of calcium chloride, may be dry milled and then wetted down with an aqueous solution of calcium chloride, for instance with about 500 cc. of water containing 6 grams $CaCl_2 \cdot 2H_2O$.

The material is dried in an oven, crushed, screened and fired on an open silica tray for 3 hours at 1160° C.

Phosphors prepared in accordance with Example II have given 105 to 108 per cent brightness when compared with an arbitrary standard, and phosphors produced by the method given in Example I have given 106 to 110 per cent brightness. Phosphors prepared under similar conditions and containing fluoride but no chloride gave about 70 per cent brightness. Similarly prepared phosphor containing only chloride gave about 35 per cent brightness (which was probably misleadingly high since the material was fired in a furnace whose atmosphere was not devoid of fluorine compounds), and similarly prepared phosphor containing no catalyst gave a brightness less than 10 per cent.

In addition to speeding up the phosphor formation, the chloride addition produces two more desirable features. It makes the powders perfectly white in daylight appearance, and it makes them very soft and friable such that mechanical grinding may be obviated.

The choice of the proper amount of catalyst depends upon several factors such as batch size to be fired, thickness of powder layer, dimensions and rate of ventilation of the furnace, etc. In general, a larger batch charge and a larger furnace will permit lower concentration of catalyst provided lead saturation of the atmosphere has been attained.

It would seem improper to refer to the fluorides and chlorides of calcium or ammonium as fluxes for two reasons. In the first place, when lead was introduced as the compound PbFCl (lead chloro-fluoride) a distinctly brighter phosphor was obtained than with either $PbCl_2$ or $PbF_2$ alone. This shows that it is the combination F-Cl which catalyzes phosphor formation. However, phosphors made with PbFCl were not as bright as powders which contained more F and Cl than the compound PbFCl furnished. This shows that the combination F-Cl should be larger, in mols, than the amount of Pb used. The excess lies in the range of about 100 to 400 per cent or more of the mol equivalent of Pb. In the second place, the calcium halides apparently do not survive the firing as such but are converted into volatile compounds and non-volatile $CaSiO_3$. By definition, a flux is a salt which promotes the reactivity of solids when present in liquid phase, without being consumed or losing its chemical identity. For the combination fluoride-chloride, therefore, the term catalyst is more appropriate in this case even though the catalyst is effective only during passing existence.

For the reasons stated above, it is difficult to give one optimum composition which will produce the brightest powders without at the same time defining a number of incidental conditions which must be fulfilled and are of geometrical or mechanical nature. Each charge and each furnace has its own optimum. In general, however, the range of concentrations of catalyst may be stated to be about .1 to 10 per cent by weight of the base formula. Most practical conditions will require concentrations from about .5 to 5 per cent for the sum of $CaCl_2$ plus $CaF_2$ where the mol ratio of Cl:F, while preferably being 1:1, may vary in the range of about 0.2:2 to 2:0.2.

The double firing method of Example I has also given very good results with phosphors of high manganese content which are usually more difficult to prepare. A red fluorescing phosphor, for example, was made as follows: A raw material batch composed of 300 grams $CaCO_3$, 240 grams silica, 40 grams $MnCO_3$, 11 grams PbO and 10 grams $CaF_2$, was ball-milled dry for two hours, then fired on an open tray at 1160° C. for 2 hours, ball-milled dry with 4 per cent by weight of the silicate, of $CaCl_2 \cdot 2H_2O$, and refired at 1160° C. for 2 hours. The resulting phosphor was white in appearance, soft and friable and of bright red fluorescence.

In any of the examples given above, the calcium fluoride or chloride may be replaced by an equivalent amount of the corresponding halide of ammonium. However, I prefer to use slightly more, in mols, of the ammonium halide than the corresponding calcium halide so that the above-mentioned figure of .1 to 10 per cent by weight of the base formula applies equally well to the ammonium halide as to the corresponding calcium halide.

What I claim as new and desire to secure by Letters Patent of the United States is:

1. The method of preparing a fluorescent composition of manganese and lead activated calcium silicate which comprises mixing compounds of calcium and silicon which when heated will react to form calcium silicate with activating proportions of manganese and lead compounds, and firing the mixture at a temperature of approximately 1000–1200° C. with additions of catalyst consisting of both a fluoride and a chloride of the group consisting of fluorides and chlorides of calcium and ammonium in a total amount of about 0.1–10% by weight and wherein the mol ratio of fluorine to chlorine is between about 0.2:2 and 2:0.2.

2. The method of preparing a fluorescent composition of manganese and lead activated calcium silicate which comprises mixing compounds of calcium and silicon which when heated will react to form calcium silicate with activating proportions of manganese and lead compounds, and firing the mixture at a temperature of approximately 1000–1200° C. with additions of catalyst consisting of both calcium fluoride and calcium chloride in a total amount of about 0.1–10% by weight and wherein the mol ratio of fluorine to chlorine is between about 0.2:2 and 2:0.2.

3. The method of preparing a fluorescent composition of manganese and lead activated calcium silicate which comprises mixing compounds of calcium and silicon which when heated will react to form calcium silicate with activating proportions of manganese and lead compounds and with about .5 to 5 per cent by weight of fluoride catalyst of the group consisting of calcium fluoride and ammonium fluoride, heating the mixture at a temperature of about 1000–1200° C. for about 2 hours, remixing the resultant product with about .5 to 10 per cent by weight of chloride catalyst of the group consisting of calcium chloride and ammonium chloride and refiring at a temperature of about 1000–1200° C. for about one to two hours.

4. The method of preparing a fluorescent composition of manganese and lead activated calcium silicate which comprises mixing calcium carbonate and silica in proportions to yield calcium silicate with activating proportions of manganese carbonate and lead oxide and with calcium fluoride, heating the mixture at a temperature of about 1000–1200° C. for about 2 hours, remixing the resultant product with calcium chloride and refiring at a temperature of about 1000–1200° C. for about one to two hours, the calcium fluoride and calcium chloride being in approximately equal molecular proportions and in a total amout of about 0.1 to 10 per cent by weight of the calcium silicate.

HERMAN C. FROELICH.

REFERENCES CITED

The following references are of record in the file of this patent:

UNITED STATES PATENTS

| Number | Name | Date |
|---|---|---|
| 2,474,193 | Schulman | June 21, 1949 |
| 2,497,140 | Schulman | Feb. 14, 1950 |
| 2,499,307 | Ginther | Feb. 28, 1950 |

FOREIGN PATENTS

| Number | Country | Date |
|---|---|---|
| 544,444 | Great Britain | Apr. 14, 1942 |